United States Patent
Liebsch et al.

(10) Patent No.: US 8,693,983 B2
(45) Date of Patent: Apr. 8, 2014

(54) METHOD FOR OPERATING A MOBILE NETWORK FOR CHARGING TRAFFIC AND CORRESPONDING MOBILE NETWORK

(75) Inventors: Marco Liebsch, Heidelberg (DE); Paulo Ferrer Loureiro, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 164 days.

(21) Appl. No.: 13/514,183

(22) PCT Filed: Feb. 16, 2011

(86) PCT No.: PCT/EP2011/000740
§ 371 (c)(1),
(2), (4) Date: Jun. 6, 2012

(87) PCT Pub. No.: WO2011/101131
PCT Pub. Date: Aug. 25, 2011

(65) Prior Publication Data
US 2012/0243432 A1    Sep. 27, 2012

(30) Foreign Application Priority Data

Feb. 17, 2010    (EP) ..................... 10001600

(51) Int. Cl.
*H04M 11/00*    (2006.01)
(52) U.S. Cl.
USPC ...... 455/406; 455/414.1; 455/418; 455/422.1
(58) Field of Classification Search
USPC ............................ 455/406, 414.1, 418, 422.1
See application file for complete search history.

(56) References Cited

U.S. PATENT DOCUMENTS

| | | | |
|---|---|---|---|
| 8,375,128 B2 * | 2/2013 | Tofighbakhsh et al. | 709/226 |
| 2009/0182883 A1 | 7/2009 | Giaretta et al. | |
| 2013/0316673 A1 * | 11/2013 | Goldner | 455/406 |

FOREIGN PATENT DOCUMENTS

| | | |
|---|---|---|
| WO | 2008-094401 A2 | 8/2008 |
| WO | 2009-152178 A1 | 12/2009 |
| WO | 2010/003464 A1 | 1/2010 |

OTHER PUBLICATIONS

Japanese Office Action, dated Jul. 10, 2013, from corresponding JP application.

(Continued)

*Primary Examiner* — Nghi H Ly
(74) *Attorney, Agent, or Firm* — Young & Thompson (57) ABSTRACT

A method for operating a mobile network, especially for charging traffic within the mobile network, wherein monitoring of chargeable events regarding traffic from and/or to a mobile node will be performed by a Charging Function for collecting charging data. The method is characterized in that a Charging Function's sub-function for monitoring of chargeable events on a data flow level or IP (Internet Protocol) flow level will be additionally located—as an additional sub-function D-CEMF (Delegated Chargeable Event Monitoring Function)—on at least one further network element, which is different from the Charging Function and which allows to traverse breakout and/or localized traffic of the mobile node, so that the Charging Function and the further network element each are including such a sub-function, and that the additional sub-function D-CEMF will report information regarding monitored chargeable events to the Charging Function. A mobile network for carrying out the method is described.

16 Claims, 7 Drawing Sheets

(56) References Cited

OTHER PUBLICATIONS

"Digital cellular telecommunications system (Phase 2+); Universal Mobile Telecommunications System (UMTS); LTE; Telecommunication management; Charging management; Charging architecture and principles (3GPP TS 32.240 version 9.0.0 Release 9)", A Technical Specification, European Telecommunications Standards Institute (ETSI), 650, Route des Lucioles; F-06921 Sophia-Antipolis; France, No. V9.0.0, Feb. 1, 2010, XP014045761, abstract p. 16, paragraph 4.—p. 21, paragraph 4.3.2.1, p. 24, paragraph 4.4—p. 25, para. 4.4.2.6—p. 29, para. 5—p. 32, para. 5.2.1.2—p. 34, para. 5.2.2—p. 36, para. 5.3.

International Search Report, dated Jun. 29, 2011, from corresponding PCT application.

* cited by examiner

METHOD FOR OPERATING A MOBILE NETWORK FOR CHARGING TRAFFIC AND CORRESPONDING MOBILE NETWORK

The present invention relates to a method for operating a mobile network or mobile communication network, especially for charging traffic within the mobile network or mobile communication network, wherein monitoring of chargeable events regarding traffic from and/or to a mobile node will be performed by a Charging Function for collecting charging data. Further, the present invention relates to a mobile network or mobile communication network, wherein the mobile network or mobile communication network is comprising a Charging Function and wherein monitoring of chargeable events regarding traffic from and/or to a mobile node will be performed by the Charging Function for collecting charging data.

Methods for operating a mobile network or mobile communication network, especially for charging traffic within the mobile network, and according mobile networks or communication networks are known from different already implemented networks. The charging architecture in mobile communication systems, for example, such as the one being specified by the 3rd Generation Partnership Project (3GPP), distinguishes between Online Charging and Offline Charging. Whereas Offline Charging collects chargeable information, i.e. data volume, session start/stop, handover events, etc., and reports collected information not in real-time to the Billing Domain, possibly some time after the service has been used, Online Charging requires real-time interaction with the charging system before and during service use. Online charging, as use for pre-paid service, requires authorization of service and resource use. Hence, before a service can be used and charged, the core network must request authorization from the Online Charging System (OCS) and grant the service to the user only after positive feedback from the OCS. The OCS assigns some resources or quota, which must be supervised by the Charging Functions in the associated gateways. In case resource usage is stopped by the OCS or the quota has been exhausted, the gateway must have means to stop the service. Hence, Online Charging requires much more interaction between Charging Functions in the core network (gateways, etc.) and the OCS.

Figure 1:
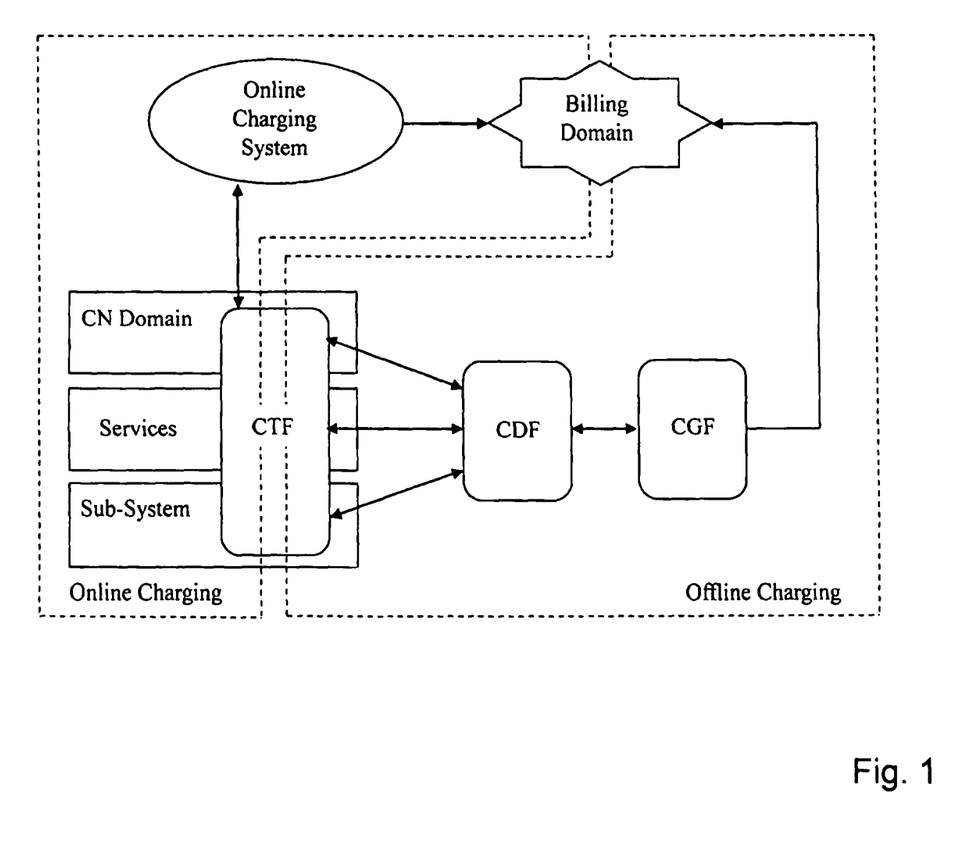
FIG. 1 is showing schematically a charging architecture model for online and offline charging.

FIG. 1 depicts the Online and Offline Charging Architecture model from 3GPP, see 3rd Generation Partnership Project. Charging architecture and principles (Release9). 3GPP TS 32.240, V9.0.0, December 2009. The common component is the low level functionality of a Charging Trigger Function (CTF), which is located on the Packet Data Network (PDN) gateways serving as mobility anchor to mobile terminals. The CTF monitors chargeable events on different levels, such as the Core Network (CN) domain (bearer level on the PDN gateway), the service level (messaging) and the subsystem level (IP Multimedia Subsystem). Offline charging considers collecting these events, which are reported from the CTF, on a Charging Data Function (CDF). The built charging data records are then delivered to the Billing Domain through a Charging Gateway Function (CGF). Online charging considers direct signaling between the CTF and the Online Charging System for real-time control of resource usage authorization procedures, quota supervision, etc. As the OCS can cause termination of a service, the CTF must have means to interact with external functions, e.g. admission control etc., to terminate usage of resources for a particular user, for example when pre-paid charge has exhausted.

Figure 2:
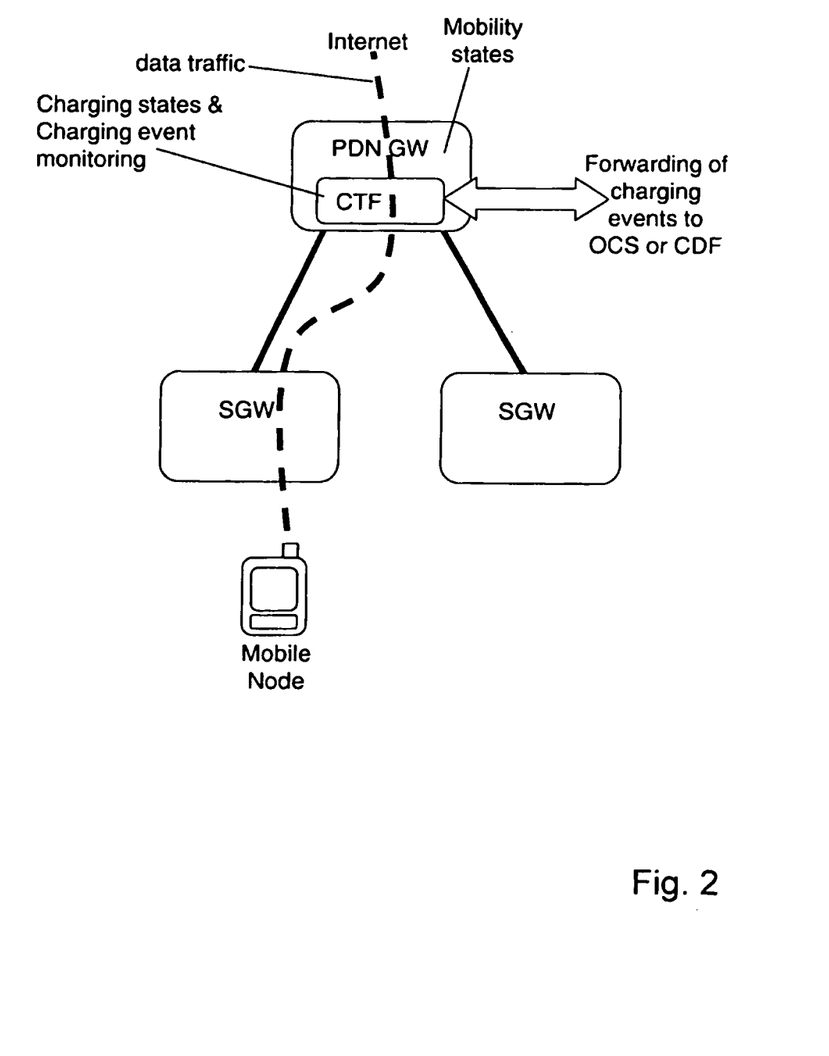
FIG. 2 is illustrating the 3GPP charging architecture for monitoring chargeable events on the PDN GW.

Current mobile communication systems comprise two mobility gateways, which forward traffic between external networks, e.g. the Internet, and the mobile node's location. The 3rd Generation Partnership Project (3GPP), for example, specifies the terms PDN Gateway for the mobile node's mobility anchor, where all traffic is routed through and the term Serving Gateway for a router, which is located close to the mobile node. While the Serving Gateway (SGW) changes with the mobile node's location, the PDN Gateway (PDN GW) remains stable as it represents the mobile node's mobility anchor. The CTF, which is responsible to collect and report chargeable events to the OCS for Online charging or the CDF for Offline charging, is co-located with the PDN GW, as the architecture assumes all traffic from/to the mobile node traverses the PDN GW. The current assumption for charging in mobile communication architectures is depicted in FIG. 2.

Mobile communication systems, such as the one being specified by 3GPP, utilize the concept of a bearer. When the mobile node attaches to the network and wants to use resources, it establishes a bearer. Each bearer binds to defined resources and quality parameters. Multiple IP data flows can share a single bearer.

With regard to charging, the PDN GW can distinguish traffic with the accuracy of single data flows, as the PDN GW implements the Policy and Charging Enforcement Function. The SGW does not perform monitoring of traffic on flow level, but only on bearer level. Such monitoring on the SGW is only needed for some roaming cases, where the SGW is located in a different provider network than the PDN GW.

Figure 3:
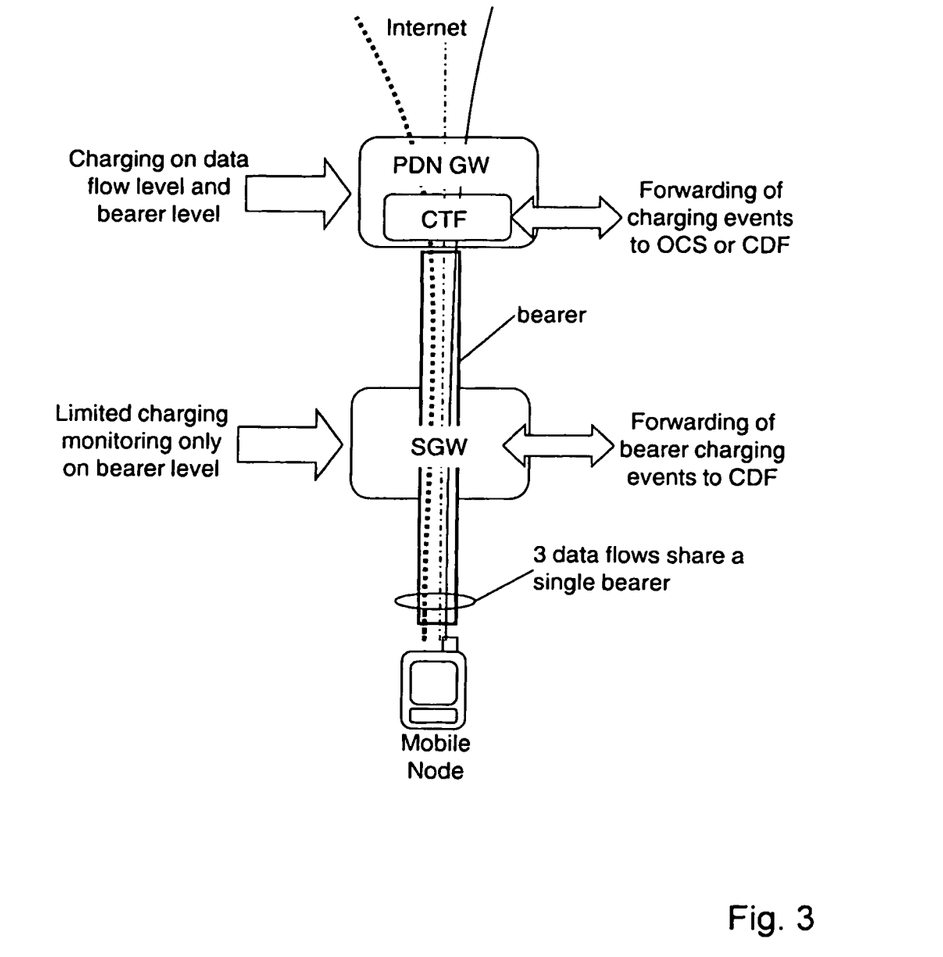
FIG. 3 is showing an IP flow monitoring on the PDN gateway and bearer monitoring on the SGW in roaming case.

In such roaming case, 3GPP considers monitoring of some charging information on the SGW. But this function is limited to information on bearer level and solely for Offline charging. FIG. 3 depicts such architecture where the SGW may report some limited events about bearer usage to a CDF for Offline charging.

Online charging as well as monitoring of charging events on data flow level on a node different from the PDN GW is not possible with the current charging architecture.

Figure 4:
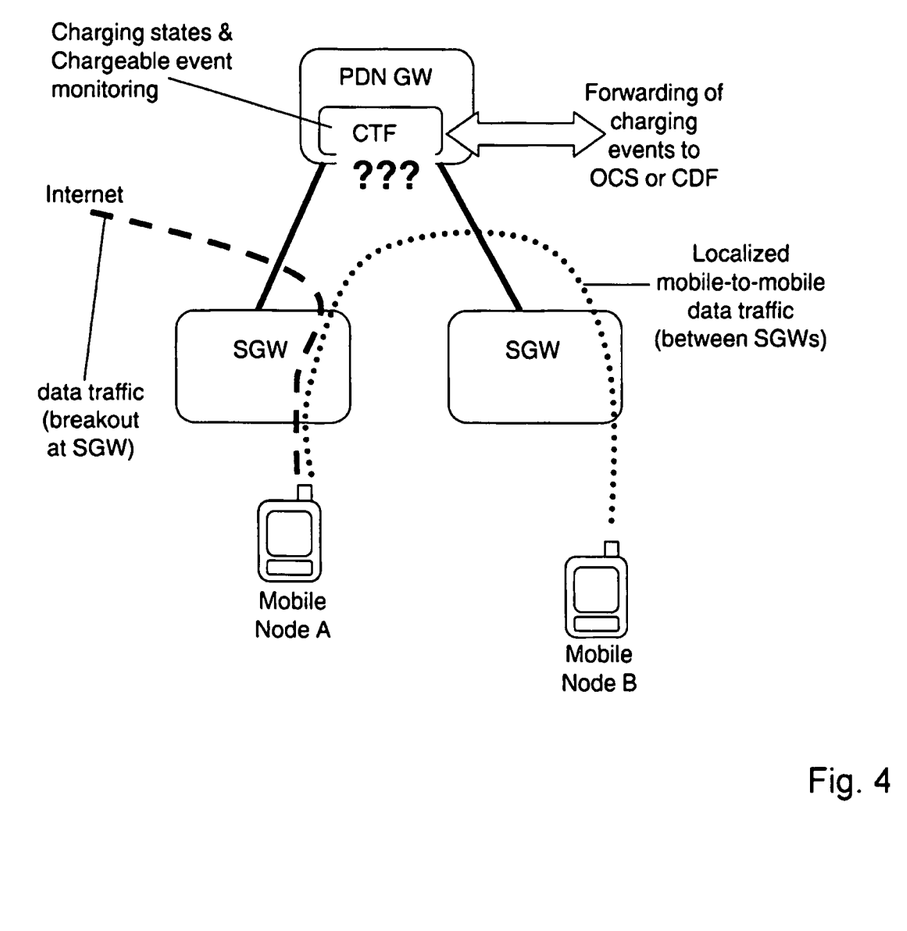
FIG. 4 is illustrating schematically the problem with the current charging architecture to perform charging of data flows for traffic offload and localized routing scenarios.

Current activities in the Internet Engineering Task Force (IETF) and 3GPP specify extensions to the mobile communication architecture and associated protocols to break out traffic from the PDN GW, e.g. for route optimization and localized traffic forwarding. As such traffic does not traverse the PDN GW anymore, charging of breakout traffic flows is not possible with the existing architecture. For such traffic offload scenarios, it is particularly important to monitor chargeable events on IP flow level. Some data flows from/to a mobile node could for example break out at the SGW and be routed towards the Internet, whereas other data flows from/to the same mobile node could be routed towards a different direction through a different path. Some remaining flows from/to the same mobile could be routed through the PDN GW without being offloaded. Such scenarios require charging on the PDN GW and on the SGW on IP flow level. Furthermore, charging must be possible for data flows, which are offloaded from the PDN GW and switched back again to be routed through the PDN GW during the data session. The problems with charging of offload traffic are depicted exemplarily in FIG. 4 for a breakout flow and localized flow routing from one mobile node to another mobile node.

A further technology being considered in 3GPP is to breakout traffic on a Traffic Offload Function (TOF), which is not located on a mobility gateway, but on the path of a traffic forwarding tunnel between the mobile node's mobility gateways. The use of a TOF for breakout is for example considered in 3GPP's General Packet Radio Service (GPRS), where the mobile node's traffic is forwarded between the Gateway GPRS Support Node (GGSN) and the Serving GPRS Support Node (SGSN) using encapsulation and tunneling. The TOF inspects the mobile node's uplink traffic and captures the associated flows' data packets for breakout. For downlink packets being sent to the mobile node, the TOF injects these packets to the tunnel for further forwarding to the mobile node. Traffic breakout is kept transparent to the SGSN and the GGSN. When the SGSN changes due to the mobile node's handover, the tunnel endpoints and the associated traffic path change as well. In case the mobile node's TOF is not on the updated tunnel path anymore, a new TOF must be chosen on the updated tunnel path between the SGSN and the GGSN. Since traffic offload using a TOF does not require any changes on the GGSN and the SGSN, the TOF must support charging of offload traffic. In case of a mobile node's handover and a change in the responsible TOF, dynamic changes of the responsible charging component must be supported.

Further details with regard to charging architectures and principles are obtainable from the following documents:

Marco Liebsch, Sangjin Jeong, and Qin Wu. PMIPv6 Localized Routing Problem Statement. draft-ietf-netext-pmip6-lr-ps.txt, October 2009.

3rd Generation Partnership Project. Packet Switched Domain Charging (Release 9). 3GPP TS 32.251, V9.2.0, December 2009.

3rd Generation Partnership Project. Diameter Charging Applications (Release 9).

The following list summarizes the problems of the current charging architecture in mobile communication systems with offload traffic and localized routing scenarios:

Monitoring of IP data flows on the SGW or another breakout gateway (e.g., eNodeB), which is not the mobile node's mobility anchor, such as the PDN GW Charging in dynamic scenarios, where traffic routing changes dynamically during a session, e.g. between breakout and routing through the PDN GW Replicating Charging Functions on the breakout gateways (e.g. the SGW or eNodeB) has the following problems:

Does not support dynamic changes in traffic routing, because a dedicated CTF, which is located on the breakout gateway, is set up for the mobile node. Changing the CTF dynamically is not supported New interfaces between breakout gateways and the OCS/CDF may conflict with operator policies and increase complexity Traffic Offload Functions, which are not located on a mobility gateway, but on the path of a tunnel between such gateways, e.g. on a router, can change during a mobile node's handover. Such Traffic Offload Functions cannot implement a complete CTF, as the CTF and the mobile node's associated charging states must be re-located as well in case the mobile node's Traffic Offload Function changes.

It is an object of the present invention to improve and further develop a method for operating a mobile network and an according mobile network for allowing a reliable and easy charging of breakout and/or localized traffic.

In accordance with the invention, the aforementioned object is accomplished by a method comprising the features of claim 1 and by a mobile network comprising the features of claim 16.

According to claim 1 the method is characterized in that a Charging Function's sub-function for monitoring of chargeable events on a data flow level or IP (Internet Protocol) flow level will be additionally located—as an additional sub-function D-CEMF (Delegated Chargeable Event Monitoring Function)—on at least one further network element, which is different from the Charging Function and which assures the traversal of breakout and/or localized traffic of the mobile node, so that the Charging Function and the further network element each are comprising such a sub-function, and that the additional sub-function D-CEMF will report information regarding monitored chargeable events to the Charging Function.

According to claim 16 the mobile network is characterized in that a Charging Function's sub-function for monitoring of chargeable events on a data flow level or IP (Internet Protocol) flow level is additionally located—as an additional sub-function D-CEMF (Delegated Chargeable Event Monitoring Function)—on at least one further network element, which is different from the Charging Function and which assures the traversal of breakout and/or localized traffic of the mobile node, so that the Charging Function and the further network element each are comprising such a sub-function, and that the additional sub-function D-CEMF is comprising means for reporting information regarding monitored chargeable events to the Charging Function.

According to the invention it has been recognized that a reliable charging of breakout and/or localized traffic is possible by splitting the function of a usual Charging Function onto different network elements. Concretely, a Charging Function's sub-function for monitoring of chargeable events on a data flow level or IP flow level will be additionally located on at least one further network element. Thus, a respective sub-function remains located at the Charging Function and a further sub-function is located on the at least one further network element. Such a further network element is different from a Charging Function or from the network element on which the Charging Function is located. Further, such an at least one further network element allows to traverse breakout and/or localized traffic of the mobile node. In other words, a Charging Function's sub-function for monitoring of chargeable events is replicated, so that the Charging Function and the further network element each comprise such a sub-function. After having recognized any chargeable event on a data flow level or IP flow level the additional sub-function will report information regarding monitored chargeable events to the Charging Function for providing a reliable charging of the traffic of the mobile node. The additional sub-function is called D-CEMF (Delegated Chargeable Event Monitoring Function).

By the realization of such a sub-function within the original Charging Function and on at least one suitable further network element a reliable and easy charging of breakout and/or localized traffic is possible.

Within a preferred embodiment the Charging Function could be a CTF (Charging Trigger Function), which could be maintained unchanged despite the additional location of the sub-function on a further network element.

However, with regard to an effective charging procedure the Charging Function could comprise a functionality to cooperate with the D-CEMF. Particularly, a receiving unit or receiving functionality could be provided within the Charging Function for receiving the reported information from the D-CEMF. A receiving unit or receiving functionality could also be provided within the D-CEMF to receive commands for delegated chargeable event monitoring from the Charging Function.

Concretely, the cooperation could comprise setting up and removing configuration on the D-CEMF and/or receiving reported information about monitored chargeable events.

Within a concrete embodiment the Charging Function could be located on a PDN GW of the network. Such a location on a PDN GW is preferred, as a large part of traffic traverses the PDN GW.

Within a further preferred embodiment the further network element could be an SGW (Serving Gateway) or any other gateway or router which allows breakout of a mobile node's traffic. Thus, a very reliable charging of breakout and/or localized traffic is possible, as such traffic traverses said SGW or gateway or router.

Within still another preferred embodiment the further network element could be an eNodeB (Evolved NodeB). A breakout of traffic is also possible from such an eNodeB. Thus, the D-CEMF could be located on such an eNodeB for reliable charging. In this case, the D-CEMF could be in communication with a further D-CEMF, which could be located on an SGW. Information regarding monitored chargeable events on the eNodeB could then be reported from the D-CEMF of the eNodeB to the D-CEMF of the SGW and further to the Charging Function.

For realizing a very reliable and easy charging of breakout and/or localized traffic the reported information could comprise data volume and/or session start/stop and/or handover events of monitored chargeable events, sessions or traffic.

Depending on the individual situation the report of information could be performed through an already existing or through a newly provided interface. In the case of use of an already existing interface no additional network elements have to be provided for realizing the inventive method.

For realizing a very comfortable and easy charging procedure the Charging Function could delegate the monitoring of chargeable events to the D-CEMF at the further network element, whenever there is a setup of a localized traffic route or a setup of traffic breakout at the further network element. Within a further preferred embodiment the further network element could delegate the D-CEMF to another network element, if a setup of a localized traffic route or a setup of traffic breakout happens at the other network element. Thus, a hierarchical structure could be realized between different further network elements.

In the case of a hierarchical structure of further network elements a D-CEMF of the other network element could report information regarding monitored chargeable events to the further network element and the further network element could report this information to the Charging Function. Thus, a gapless report and transfer of information to the Charging Function is possible.

With regard to a very sophisticated and comfortable charging procedure the Charging function could be able to distinguish events being reported from its sub-function or from a D-CEMF on the at least one further network element or from a D-CEMF of the other network element.

In the case of online charging the Charging Function could use an existing interface to an online charging system or to a billing domain for reporting charging data. In the case of offline charging the Charging Function could use an existing interface to a CDF (Charging Data Function) or to a billing domain for reporting charging data. In both cases a very reliable and easy charging of traffic is possible.

An embodiment of the invention could comprise a functional split of a particular charging relevant function (taking the 3GPP charging architecture as reference architecture) into sub-components and the replication as well as distribution of a few sub-components to represent a distributed charging architecture for charging of breakout traffic. The lowest level Charging Function in the existing architecture, the Charging Trigger Function (CTF), could be split into sub-functions.

Relevant sub-functions for monitoring chargeable events (e.g. data volume, session start/stop, etc) could then be replicated and located on a different network component, where breakout traffic traverses. In 3GPP, this may be the SGW or any other gateway or router, which allows breakout of a mobile node's traffic. The replicated sub-function(s) on the SGW are named "delegated chargeable event monitoring function (D-CEMF)" and could report measured data volume to the original CTF, which could still remain on the PDN GW. This allows maintaining existing interfaces between the charging architecture and the external charging system. As only a minimum set of Charging Functions are replicated on the PDN GW and on the SGW, metering can be performed on the PDN GW and on the SGW for normal and breakout traffic. Reporting of charging records to the external billing domain could still be performed by the original CTF and associated additional Charging Functions in the PDN GW. Additionally the delegation can be performed to network elements further close to the access network, like the eNodeB. This replicated function could then report in an hierarchical way to the SGW, which could then report back to the PDN GW.

Within the present invention key states could still be maintained in the original Charging Function. Only a minimal set of required functions could be replicated and distributed to a D-CEMF function.

Because of a possible use of existing interfaces no new interfaces from breakout gateways/routers to billing domain are needed. Thus, security issues in case of roaming are eliminated.

Important features of preferred embodiments of the invention can be summarized as follows:

1. The invention can be designated as a method for replicating an event monitoring function on the CTF, representing a function separated from the CTF, the D-CEMF
2. The D-CEMF is distributed on a different physical network element as the CTF
3. The distribution of the D-CEMF can be performed, for example, to the SGW or eNodeB
4. Main states for charging are kept in the CTF
5. Monitoring-related states are established and maintained on both, the monitoring sub-function on the CTF and on the D-CEMF.
6. The D-CEMF can be located on a network entity which traverses breakout/localized traffic
7. The D-CEMF can be further delegated to network elements closer to the access and report events in an hierarchical way.
8. The D-CEMF monitors the breakout traffic as per delegation from the CTF
9. Events being monitored on the D-CEMF are reported to the CTF
10. The CTF may process reported events in the same manner, independent of whether they were reported from the local monitoring sub-function or from the remote D-CEMF.
11. The CTF may be able to distinguish events being reported from the local monitoring function or from the remote D-CEMF
12. The CTF may treat events being reported differently, dependent on whether they come from the CTF-local monitoring function or from the remote D-CEMF
13. The CTF may process the reported events and use the exiting interface towards the billing system according to existing standards
14. For Online charging, the CTF may use the existing interface to the online charging system 15. For offline charging, the CTF may use the existing interface to the CDF The claimed invention enables a reliable charging of breakout traffic without the need for adding any additional interfaces or functional entities.

There are several ways how to design and further develop the teaching of the present invention in an advantageous way. To this end, it is to be referred to the patent claims subordinate to patent claim 1 on the one hand and to the following explanation of preferred examples of embodiments of the invention, illustrated by the drawing on the other hand. In connection with the explanation of the preferred embodiments of the invention by the aid of the drawing, generally preferred embodiments and further developments of the teaching will we explained. In the drawings

Figure 5:
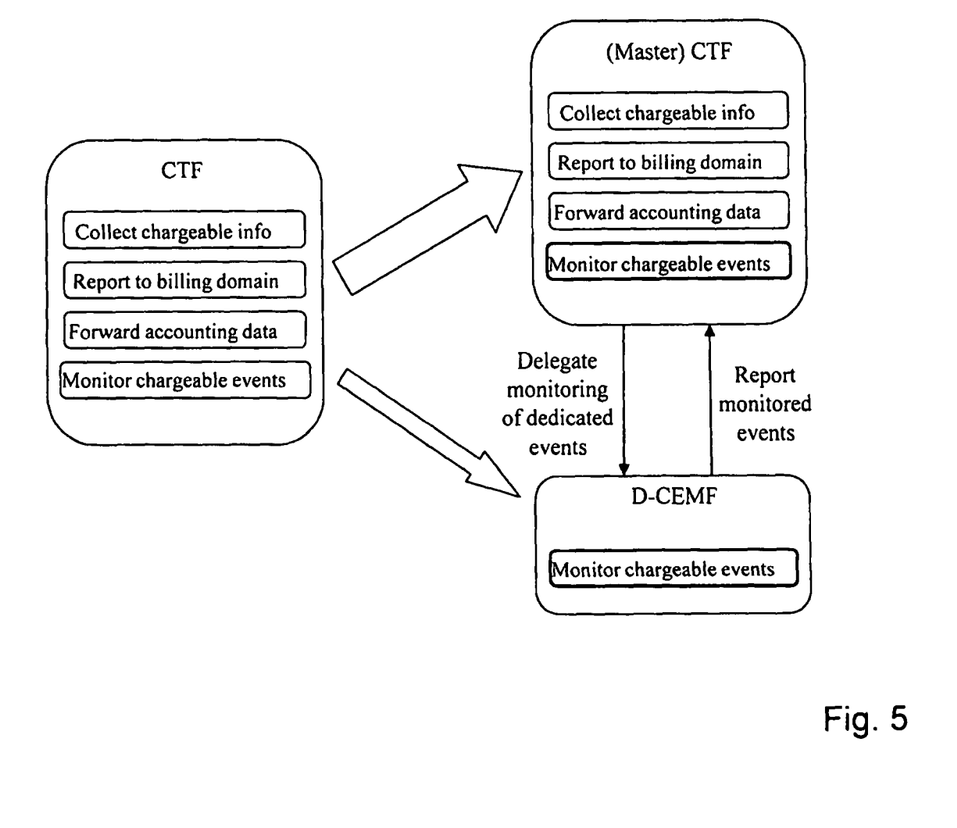
FIG. 5 is illustrating a first embodiment of a method for operating a mobile network according to the invention with an inter-working between the D-CEMF and the CTF.

According to a preferred embodiment of the invention a functional split of a Charging Trigger Function into sub-functions and the replication as well as distribution of a sub-function is realized, to represent a distributed charging architecture for charging of breakout traffic. This is depicted in FIG. 5. The lowest level charging function for data packet measurement and collection of traffic data, the Charging Trigger Function (CTF), is split into sub-functions and the relevant sub-functions for monitoring chargeable events on IP flow level are then replicated and located on the SGW or any other gateway or router, which allows breakout of a mobile node's traffic. The new external support function, which can be located for example on the SGW, is named 'Delegated Chargeable Event Monitoring Function (D-CEMF)' and reports events to the 'CTF', which still remains on the PDN GW. The (Master) CTF represents the original CTF, which implements additional functionality to inter-work with the remote D-CEMF, such as a D-CEMF adapter. Virtually, the CTF-local chargeable event monitoring function (Master) and the remote chargeable event monitoring function in the D-CEMF may appear as single monitoring function to the remaining functions of the CTF. However, the reported events may allow the CTF to differentiate between locally and remotely reported events.

As an important characteristic of the invention, monitoring of chargeable events for IP flows can be performed on the CTF and on the D-CEMF for the same event a point in time, which supports dynamic changes of routes between breakout, localized or PDN Gateway routed traffic without modifications and updates in the states of charging functions. Furthermore, the proposed extension allows maintaining existing interfaces between the charging architecture and the external charging system without the need to introduce additional interfaces, which potentially conflict with network providers' policy. The proposed extension avoids unwanted new interfaces, such as between a SGW in the visited operator network and the OCS being associated with the home provider network. As only a minimum set of charging functions are replicated on the PDN GW and on the SGW, monitoring of chargeable events based on IP flow level can be performed on the PDN GW and on the SGW for normal and breakout traffic. Reporting of charging information to the external charging components, such as the OCS and the CDF, is still performed by the CTF, which is located in the PDN GW according to the examples in this description.

Figure 6:
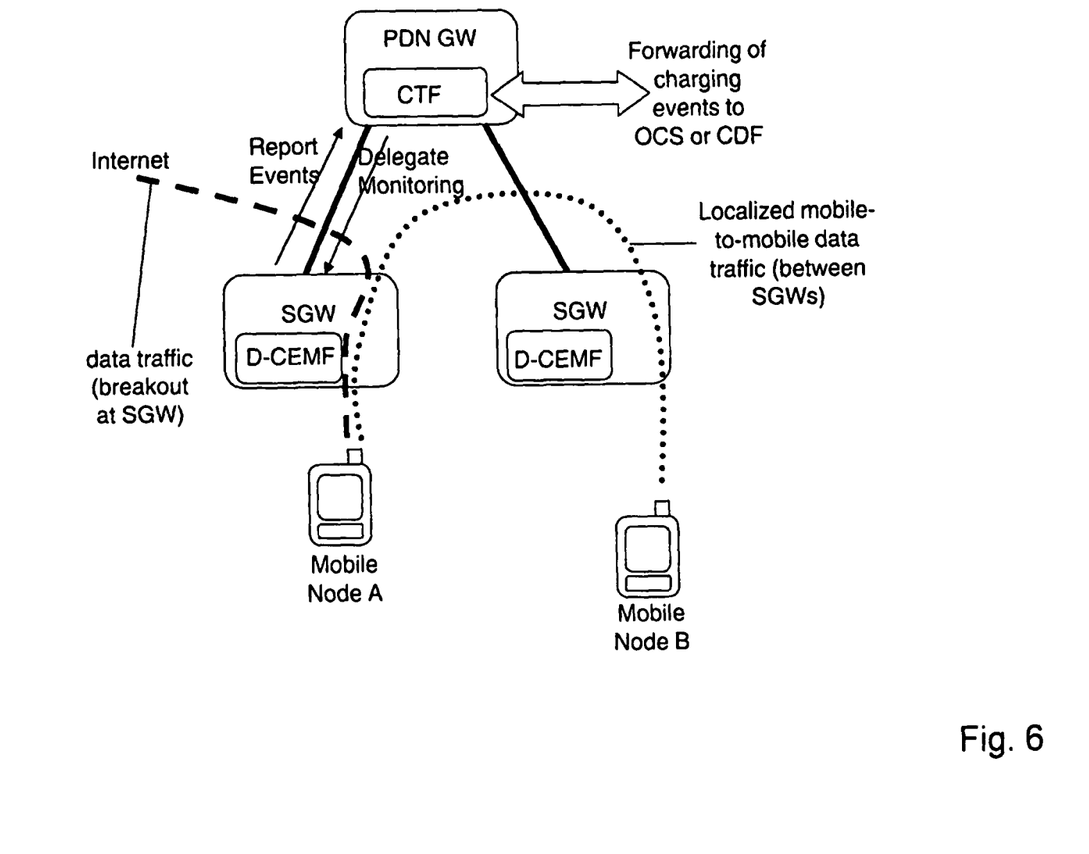
FIG. 6 is illustrating schematically a deployment of the different charging functionalities according to the invention and FIG. 7 is showing schematically a deployment of the distributed different functions using an hierarchical approach according to the invention.

An example of a possible deployment is given in FIG. 6. Whenever there is a setup of a localized route or a setup of breakout traffic at the SGW, the CTF at the PDN GW delegates the monitoring of chargeable events to the D-CEMF—at the SGW—for the given flows. From this point on, the D-CEMF will report the monitored events to the CTF at the PDN GW where they can be sent to the CDF for offline charging or to the OCS for online charging.

Figure 7:
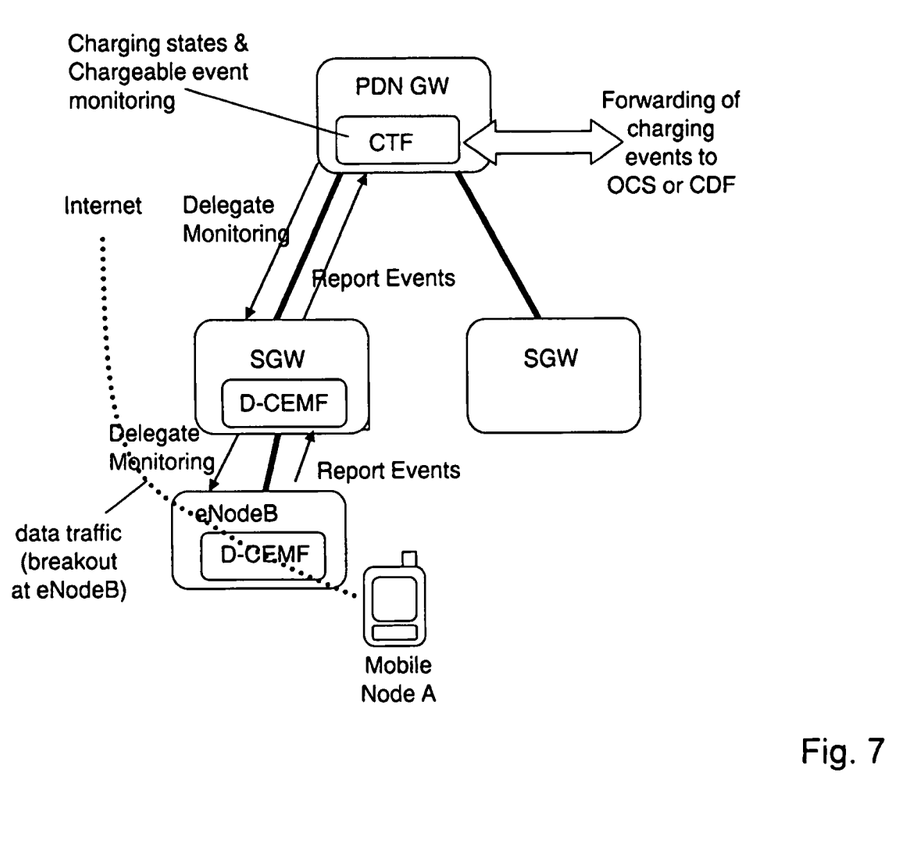

FIG. 7, depicts the case where the D-CEMF is further delegated to other network entities where the traffic breakout occurs. In this mode of operation the SGW further delegates the metering of chargeable events to the eNodeB where the Internet traffic is broken out. From this point on, the metering reports are sent to the SGW, which then forwards them to the main CTF at the PDN GW.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating a mobile network, especially for charging traffic within the mobile network, wherein monitoring of chargeable events regarding traffic from and/or to a mobile node will be performed by a Charging Function for collecting charging data,
    characterized in that a Charging Function's sub-function for monitoring of chargeable events on a data flow level or IP (Internet Protocol) flow level will be additionally located—as an additional sub-function D-CEMF (Delegated Chargeable Event Monitoring Function)—on at least one further network element, which is different from the Charging Function and which assures the traversal of breakout and/or localized traffic of the mobile node, so that the Charging Function and the further network element each are comprising such a sub-function, and that the additional sub-function D-CEMF will report information regarding monitored chargeable events to the Charging Function.

2. A method according to claim 1, wherein the Charging Function is a CTF (Charging Trigger Function).

3. A method according to claim 1, wherein the Charging Function comprises a functionality to cooperate with the D-CEMF.

4. A method according to claim 3, wherein the cooperation comprises setting up and removing configuration on the D-CEMF and/or receiving reported information about monitored chargeable events.

5. A method according to claim 1, wherein the Charging Function is located on a PDN GW (Packet Data Network Gateway) of the network.

6. A method according to claim 1, wherein the further network element is an SGW (Serving Gateway) or any other gateway or router which allows breakout of a mobile node's traffic.

7. A method according to claim 1, wherein the further network element is an eNodeB (evolved NodeB).

8. A method according to claim 1, wherein the reported information comprises data volume and/or session start/stop and/or handover events of monitored chargeable events, sessions or traffic.

9. A method according to claim 1, wherein the report of information will be performed through an already existing or through a newly provided interface.

10. A method according to claim 1, wherein whenever there is a setup of a localized traffic route or a setup of traffic breakout at the further network element, the Charging Function delegates the monitoring of chargeable events to the D-CEMF at the network element.

11. A method according to claim 1, wherein the further network element delegates the D-CEMF to another network element, if a setup of a localized traffic route or a setup of traffic breakout happens at the other network element.

12. A method according to claim 11, wherein a D-CEMF of the other network element will report information regarding monitored chargeable events to the further network element and the further network element will report this information to the Charging Function.

13. A method according to claim 1, wherein the Charging Function is able to distinguish events being reported from its sub-function or from a D-CEMF on the at least one further network element or from a D-CEMF of the other network element.

14. A method according to claim 1, wherein the Charging Function uses an existing interface to an online charging system or to a billing domain for reporting charging data in the case of online charging.

15. A method according to claim 1, wherein the Charging Function uses an existing interface to a CDF (Charging Data Function) or to a billing domain for reporting charging data in the case of offline charging.

16. A mobile network, preferably for carrying out the method for operating a mobile network, especially for charging traffic within the mobile network, according to claim 1, wherein the mobile network is comprising a Charging Function and wherein monitoring of chargeable events regarding traffic from and/or to a mobile node will be performed by the Charging Function for collecting charging data, characterized in that a Charging Function's sub-function for monitoring of chargeable events on a data flow level or IP (Internet Protocol) flow level is additionally located—as an additional sub-function D-CEMF (Delegated Chargeable Event Monitoring Function)—on at least one further network element, which is different from the Charging Function and which assures the traversal of breakout and/or localized traffic of the mobile node, so that the Charging Function and the further network element each are comprising such a sub-function, and that the additional sub-function D-CEMF is comprising means for reporting information regarding monitored chargeable events to the Charging Function.

* * * * *